United States Patent [19]

Akeel

[11] Patent Number: 4,708,580

[45] Date of Patent: Nov. 24, 1987

[54] MECHANICAL WRIST MECHANISM

[75] Inventor: Hadi A. Akeel, Sterling Heights, Mich.

[73] Assignee: GMF Robotics Corporation, Auburn Hills, Mich.

[21] Appl. No.: 928,745

[22] Filed: Nov. 10, 1986

Related U.S. Application Data

[63] Continuation of Ser. No. 692,994, Jan. 22, 1985, abandoned.

[51] Int. Cl.$^4$ .............................................. B25J 17/02
[52] U.S. Cl. ..................................... 414/735; 74/479; 277/53; 901/26; 901/29
[58] Field of Search ............. 414/735; 901/15, 25–29; 74/417, 423, 479, 665 C, 665 D; 227/53-56

[56] References Cited

U.S. PATENT DOCUMENTS 4,402,234  9/1983  Malarz et al. ......................... 901/29

FOREIGN PATENT DOCUMENTS 0080325  6/1983  European Pat. Off. .............. 901/29

Primary Examiner—Robert J. Spar
Assistant Examiner—Donald W. Underwood
Attorney, Agent, or Firm—Brooks & Kushman

[57] ABSTRACT

A three-axis wrist mechanism has three independent rotational axes with two points of mutual intersection which are offset from each other. The offset provides a generous bend radius for the wrist. First and second housing structures contain the first and second axes while the third axis is disposed within a tool support member. The first housing structure is adapted to be mounted to an outer tubular member of the arm of a robot to rotate independently of the rest of the mechanism. Gear trains of the mechanism provide the independent rotation of the second housing structure and the tool support member to permit selective positioning of a tool-mounting surface of the tool support member within a work envelope. The gear trains are arranged so that an unobstructed passage is maintained between an arm-mounting surface of the first housing structure and the tool-mounting surface of the tool support member for accommodating hoses and/or wires which are used to transmit fluid and power to a tool mounted on the surface of the tool support member.

7 Claims, 3 Drawing Figures

MECHANICAL WRIST MECHANISM

This application is a continuation of application Ser. No. 692,994, filed Jan. 22, 1985, now abandoned.

TECHNICAL FIELD

This invention relates to mechanical wrist mechanisms and, more particularly, to three-axis wrist mechanisms which have an unobstructed passage extending between its opposite ends.

BACKGROUND ART

Wrist mechanisms are designed to orient its end effector as demanded by workpiece placement. Wrist mechanisms provide three articulations that offer motions commonly called pitch, yaw and roll. Similar articulations of the arm deliver the wrist assembly anywhere in the robot's sphere of influence. Thereafter it requires three more articulations of the wrist mechanism for universal orientation of the end effector.

Many mechanical wrist mechanisms are multi-axes mechanisms. For example, U.S. Pat. Nos. 3,231,098 and 3,315,542 both disclose such mechanisms. Many of such mechanisms, however, do not provide an unobstructed passageway which provides protection for hoses and wires which respectively provide fuel and power to a work tool mounted on the free end of the wrist mechanism.

U.S. Pat. No. 4,218,166 discloses a multi-axis wrist mechanism which provides independent movement about two axes and which maintains an unobstructed passage between a stationary base and a work tool.

U.S. Pat. No. 4,402,234 to Malarz et al discloses a wrist mechanism having three independent rotational axes which are mutually intersecting. A gearing mechanism controls the independent rotation of components supported for rotation about the three axes and also provides an unobstructed internal passageway for housing hoses and/or wires. The use of such a wrist mechanism, however, is somewhat limited and/or difficult due to the relatively small internal bend radius of the wrist mechanism. This imposes limitations on the amount of rotational movement that the housed hoses and wires will permit. Such a small bend radius furthermore makes programming of the robot to which the wrist mechanism is attached more difficult. This occurs because the freedom of movement of the wrist mechanism is limited which the programmer must take into consideration.

Other U.S. patents which disclose wrist mechanisms of lesser relevance include U.S. Pat. Nos. Re. 25,889; 2,514,250; 2,861,700; 2,871,701; 3,043,448; 3,066,805; 3,108,498; 3,182,813; 3,784,031; 4,001,556; 4,068,536; 4,099,409; 4,149,278; 4,353,677; 4,356,554; 4,365,928; 4,370,836 and 4,392,776.

DISCLOSURE OF THE INVENTION

An object of the present invention is to provide an improved three-axis mechanical wrist mechanism with an unobstructed passageway and including three independent rotational axes which have a pair of mutually intersecting points to provide greater flexibility in positioning a wide variety of tool members in a work envelope.

Another object of the present invention is to provide an improved mechanical wrist mechanism having three independent axes of rotation while maintaining an unobstructed passage therethrough and having a generous internal bend radius which simplifies programming of the robot to which the wrist mechanism is attached and also offers the use of larger gearing so that the wrist mechanism can support and manipulate relatively heavy tools attached thereto.

In carrying out the above objects and other objects of the invention, a mechanical wrist mechanism constructed in accordance with the present invention comprises three independent rotational axes, the first pair of said axes having a first point of mutual intersection and a second pair of the axes having a second point of mutual intersection offset from the first point. First and second housing means are rotatably supported on respective ones of the first and second axes. The first housing means includes an arm-mounting surface. A tool support member is rotatable on the third axis and includes a tool-mounting surface. Gear means are provided for independent rotation of the support member and second housing means about their respective axes for selectively establishing the position of the tool-mounting surface within a work envelope. A continuously unobstructed passage means is disposed between the arm-mounting surface and the tool-mounting surface. The passage means includes cavities in the first and second housing means and the tool support member for the enclosed containment of work tool related structures.

Preferably, the passage means includes a pair of substantially identical plastic guide members defining the cavities which include the first and second points of mutual intersection.

Also, preferably, the first pair of axes are angularly displaced by a fixed angle greater than 30°.

Yet, still preferably, the offset between the first and second points is selectable to allow generous bend radii of hoses and the use of larger gears and wider internal passages. The offset is determined by passager diameter and bend radius of the central axis.

The mechanical wrist mechanism as constructed above provides: a greater bend radius to accommodate the twisting motion of the various cables, wires and conduits necessary for the work tool; makes the programming of the robot to which the wrist mechanism is attached simpler; and allows the wrist mechanism to carry a relatively heavy payload.

Other advantages of the present invention will be readily appreciated as the same becomes better understood by reference to the following detailed description when considered in connection with the accompanying drawings.

BEST MODE FOR CARRYING OUT THE INVENTION

Figure 1:
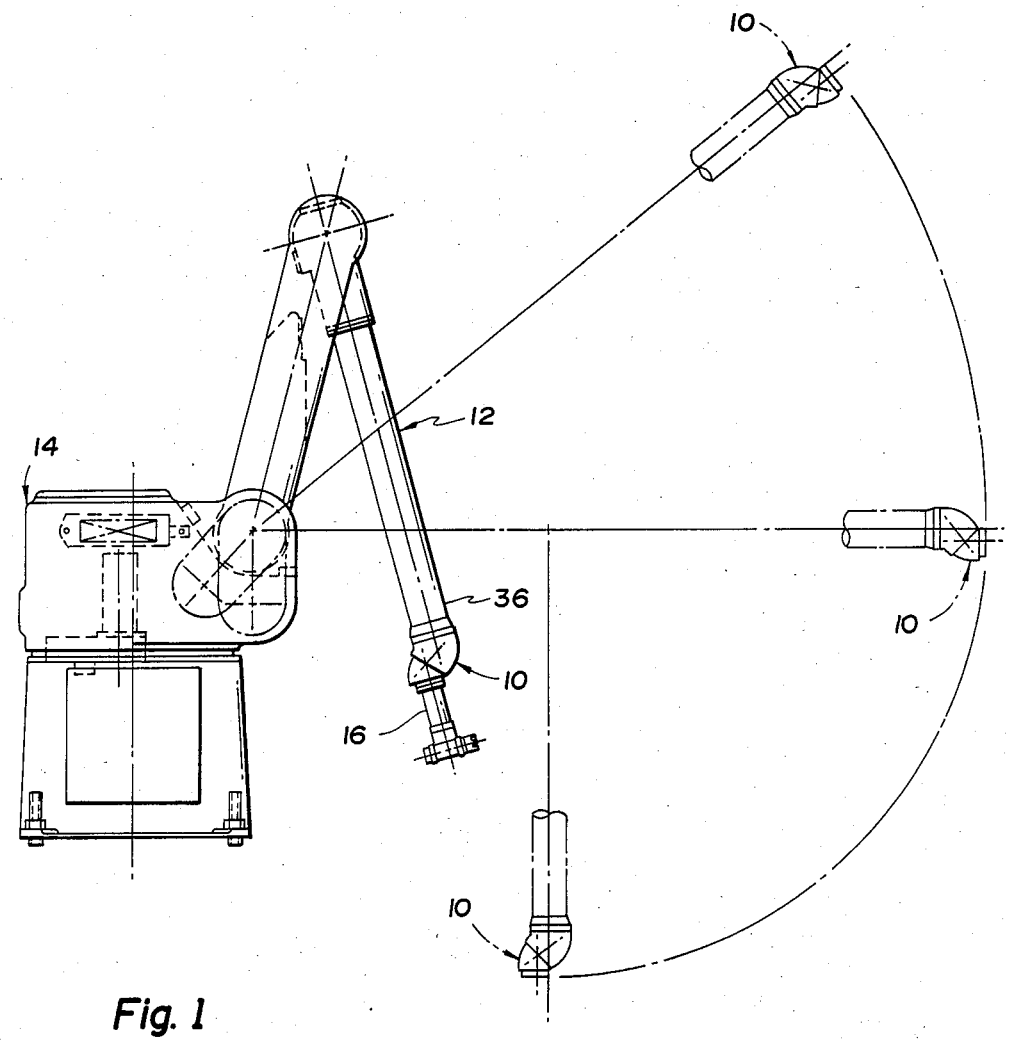
FIG. 1 is a side elevational view of a robot with a wrist mechanism constructed in accordance with the present invention attached at the free end of an outer arm thereof, various positions of the wrist mechanism being illustrated in phantom.

Referring now to FIG. 1 there is shown a three-axis wrist mechanism, generally indicated at 10, which is connected to an outer arm 12 of a robot, generally indicated at 14. It is to be understood, however, that the wrist mechanism 10 may also be connected to a boom or support arm of many other different types of robots in order to move an end effector or work tool within a work envelope, as shown in FIG. 1.

As illustrated in FIG. 1, a work tool 16 is mounted at the free end of the wrist mechanism 10. The tool 16 may comprise a welder or paint sprayer or other device which is useful in the assembly or finishing of a product.

Figure 2:
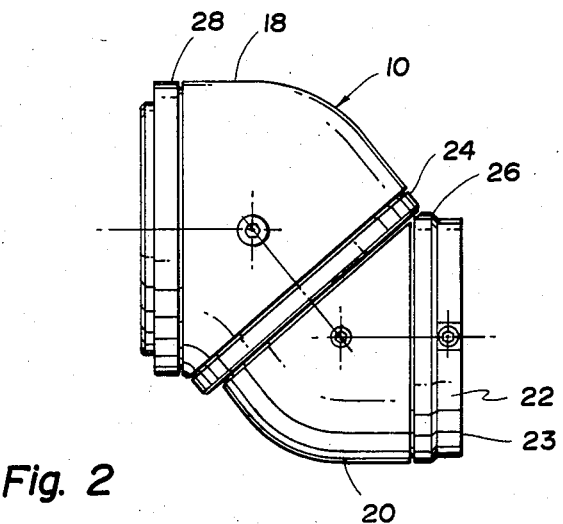
FIG. 2 is a side elevational view of the wrist mechanism.

As shown in FIG. 2, the wrist mechanism 10 includes an outer knuckle or first housing structure 18, an inner knuckle or second housing structure 20 and a spindle or tool support member 22. The spindle 22 includes a tool mounting surface or face 23 on which a wide variety of tools can be readily mounted, such as the tool 16.

A tubular retainer 24 is attached to the center outer knuckle 18 between the outer knuckle 18 and the inner knuckle 20. Similarly, a tubular retainer 26 is attached to the inner knuckle 20 between the inner knuckle 20 and the spindle 22. Likewise, a tubular mounting ring 28 is provided at the free end of the outer knuckle 18 to facilitate coupling of the wrist mechanism 10 to the arm 12 of the robot 14.

Figure 3:
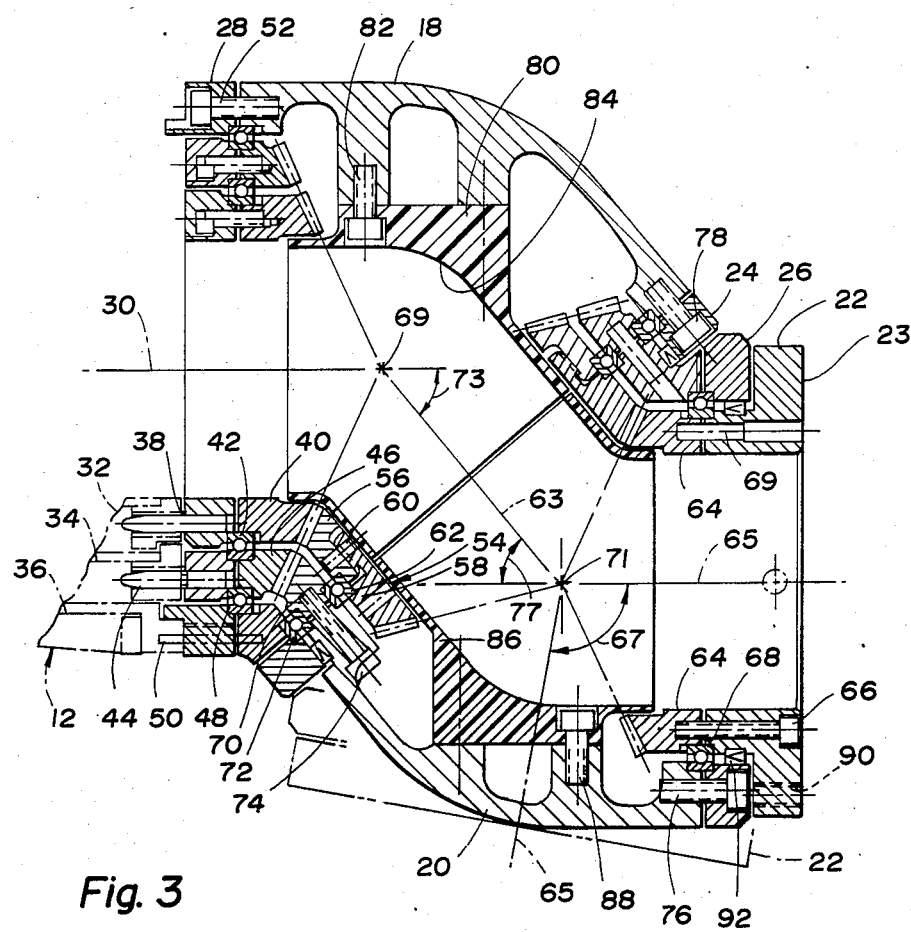
FIG. 3 is sectional view, slightly enlarged of the wrist mechanism of FIG. 2 wherein a second position of the wrist mechanism is indicated in phantom.

Referring now to FIG. 3, a mounting ring 28 and the outer knuckle 18 have a longitudinal axis 30 about which are circumferentially spaced a plurality of input or drive tubes indicated in phantom at 32, 34 and 36 of the arm 12. The mechanism 10 is readily adapted to be secured to the tubes 32, 34 and 36. For example, the innermost drive tube 32 is connected by a drive pin 38 to a bevel gear 40 which is rotatably supported by ball bearings 42 in the mechanism 10. One bearing 42 is shown of the type that can carry rolling force moments. Alternatively, two axially spaced radial bearings may replace the bearing 42.

The drive tube 34 is similarly connected by a drive pin 44 to an intermediate bevel gear 46 and is rotatably supported by bearings 48. The outer drive tube 36 is connected to the mounting ring 28 by a dowel 50. In turn, the mounting ring 28 is fixedly secured to the outer knuckle 18 by screws 52, only one of which is shown in FIG. 3.

A second bevel gear, generally indicated at 54, meshes with the bevel gear 40 and therefore rotates in response to rotation of the input tube 32. The bevel gear 54 includes a pair of bevel gear halves 56 and 58, which are threadedly engaged and which are pinned together by dowels 60, only one of which is shown in FIG. 3. The bevel gear halves 56 and 58 are provided so that there is uniformity of gear parts.

Likewise, the gear halves 56 and 58 are rotatably supported by bearings 62. The bearings 62 allow the inner knuckle 20 to rotate about a second longitudinal axis 63. The axes 30 and 63 intersect at a point 69, the angle of intersection 73 preferably being fixed at 50°.

The bevel gear half 58 also meshes with an output bevel gear 64 which, in turn, is fixedly mounted to the spindle 22 by screws 66, only one of which is shown in FIG. 3. The gear 64 and the spindle 22 are also pinned together at 69. In turn, the output bevel gear 64 and the spindle 22 are rotatably supported by bearings 68. The bearings 68 allow the spindle 22 to rotate about a third longitudinal axis 65. The axes 63 and 65 intersect at a point 71. The point 71 is offset from the point 69 to increase the inner bend radius of the wrist mechanism, simplify programming of the robot to which the wrist mechanism is attached, and to facilitate the use of relatively larger gears. Larger gears enable the wrist mechanism to drive a larger payload without compromising the size of the passageway through the mechanism. The passageway is described in greater detail hereinbelow.

The angle of intersection 77 between the axes 63 and 65 is preferably equal to angle 73. Accordingly, the orientation in space of the axis 65 changes by an angle 67, equal to the sum of angles 73 and 77, as the axis 65 moves between the solid line position to the phantom line position in FIG. 3. The spindle 22 can be moved from its solid line position to its phantom line position in FIG. 3 by rotation of the inner knuckle 20 180° while maintaining the position of the outer knuckle 18.

The input bevel gear 46 meshes with a second intermediate bevel gear 70. The intermediate bevel gear 70 is rotatably supported by bearings 72. The bevel gear 70 is fixedly connected to the inner knuckle 20 by screws 74, only one of which is shown in FIG. 3. The retainer 26 is also fixedly connected to the inner knuckle 20 by screws 76, only one of which is shown in FIG. 3. The retainer 24 is fixedly connected to the outer knuckle 18 by screws 78, again, only one of which is shown in FIG. 3.

The wrist mechanism 10 has a longitudinal passage 84 which is unobstructed along the axes 30, 63 and 65. This unobstructed passage can accommodate hoses and wires and/or cables. A first plastic guide 80 is disposed within the passage 84 and is fixedly connected at the inner surface of the outer knuckle 18 by screws, only one of which is shown at 82. A second plastic guide 84 is fixedly secured at the inner surface of the inner knuckle 20 by screws 88, only one of which is shown. The inner surfaces of the plastic guides 80 and 86 help to define the unobstructed passage 84 through the wrist mechanism 10. The guides 80 and 84 not only help to control the bend radius internal to the wrist mechanism, but also helps to contain the lubricant of the gears of the wrist mechanism and provides a smooth surface for hoses and cables to slide upon.

The spindle 22 is adapted to support a work tool at its mounting face 23, such as a welder or paint sprayer or other device which is useful in the assembly and/or finishing of a product. Threaded holes, only one of which is shown at 90, are provided for this purpose.

Seals 92 may be positioned between the opposing surfaces of the retainer 26 and the spindle 22 and also between the retainer 24 and the intermediate bevel gear 70 and the inner knuckle 20. The seals 92 prevent contamination of the bearings 68 and 72 when the wrist mechanism is used in a hostile environment.

From the position shown in FIG. 3, the tool mounting surface 23 can be rotated through 360° by rotation of the inner knuckle 20. By judicious rotation of the inner knuckle 20, the axis 65 can be selectively positioned in an envelope defined by outer limits which are displaced from the axis 30 by the difference of the measure of angles 73 and 77 at one extreme and by the measure of the sum of the angles 73 and 77 at the other extreme (i.e. from 0 [parallel to axis 30] to 100°, if both angles 73 and 77 are equal to 50°, as shown by angle 67). Within this envelope the tool-mounting surface 23 can be rotated substantially 360° so that a tool disposed on the mounting surface 23 can be positioned in a wide variety of positions.

The wrist mechanism 10 is particularly useful for robots which are controlled to perform various manufacturing and production processes, such as spray painting and welding. The wrist mechanism 10 can also be used with a clamp device which could be operated to position a component during assembly.

The rotary motion of the input tubes 32, 34 and 36 can be accomplished by any available well-known rotary drive devices, such as electric motors, pneumatic motors or hydraulic motors. If desired, the input of drive tubes 32, 34 and 36 can be manipulated manually. It is apparent that the rotation of these input tubes can be controlled in a desired pattern by using a computer having an appropriate program to control their rotation. These devices are only cited by way of example and it will be apparent from the foregoing description that the wrist mechanism 10 can be useful in many instances where a universal positioning device is necessary.

The above-noted construction of the wrist mechanism 10 allows for a more generous bend radius than provided by prior art wrist mechanisms and also simplifies programming of a robot controller which controls the rotation of the input drive shafts. Further, this construction allows the use of larger gears without sacrificing the size of the wrist or the unobstructed passageway. In turn, the larger gears are able to drive a larger payload on the free end of a wrist mechanism of a given volumetric size.

The invention has been described in an illustrative manner and it is to be understood that the terminology which has been used is intended to be in the nature of words of description, rather than of limitation.

Obviously, many modifications and variations of the present invention are possible in light of the above teachings. It is therefore to be understood that within the scope of the appended claims, the invention may be practiced otherwise than as specifically described.

What is claimed is:

1. A mechanical wrist mechanism for positioning a work tool comprising:

three independent rotational axes, a first pair of said axes having a first point of mutual intersection and a second pair of said axes having a second point of mutual intersection offset from said first point;

first and second housing means defining an internal wrist cavity including a gear housing compartment and a tool service compartment and rotatably supported on respective ones of first and second of said axes, the first housing means including an arm-mounting surface;

a tool support member rotatable on a third of said axes including a tool-mounting surface;

gear means disposed in said gear housing compartment for providing independent rotation of said tool support member and said second housing means about their respective axes for selectively establishing the position of said tool-mounting surface within a work envelope; and continuous unobstructed passage means between the arm-mounting surface and the tool-mounting surface for the enclosed containment of work tool related structures wherein said passage means includes guide means mounted for rotation with said first and second housing means for defining said gear housing and tool service compartments in the first and second housing means including said first and second points of mutual intersection and cooperating with said first and second housing means for sealing said gear housing compartment to prevent contamination of said tool service compartment.

2. The mechanism as claimed in claim 1 wherein said guide means includes first and second guide members mounted for rotation with their respective first and second housing means.

3. The mechanism as claimed in claim 1 wherein said first housing means includes a mounting ring adapted to be connected to the arm of a robot.

4. The mechanism as claimed in claim 1 wherein the width of any of the cavities at a point on its corresponding axis along said passage means is greater than one-third of the corresponding width of said wrist mechanism at such point.

5. The mechanism as claimed in claim 1 wherein the first pair of axes includes first and second ones of said three axes, the first and second ones of the three axes being angularly fixed relative to each other by an angle greater than 30°.

6. The mechanism as claimed in claim 5 wherein a third one of said three axes is movable angularly relative to both of the first and second ones of said three axes and angularly aligned with the first one of said three axes while maintaining the point of mutual intersection with the second one of said three axes.

7. The mechanism as claimed in claim 1 or claim 2 wherein said guide means at least partially defines a labyrinthian seal.

* * * * *